US009195505B2

(12) United States Patent
Pajuelo González et al.

(10) Patent No.: US 9,195,505 B2
(45) Date of Patent: Nov. 24, 2015

(54) METHOD, SYSTEM AND AN EXECUTABLE PIECE OF CODE FOR CONTROLLING THE USE OF HARDWARE RESOURCES OF A COMPUTER SYSTEM (71) Applicant: UNIVERSITAT POLITÉCNICA DE CATALUNYA, Barcelona (ES)

(72) Inventors: Alejandro Pajuelo González, Barcelona (ES); Javier Verdú Mulá, Barcelona (ES)

(73) Assignee: UNIVERSITAT POLITÉCNICA DE CATALUNYA (ES)

( * ) Notice: Subject to any disclaimer, the term of this patent is extended or adjusted under 35 U.S.C. 154(b) by 0 days.

(21) Appl. No.: 14/395,488

(22) PCT Filed: Apr. 18, 2013

(86) PCT No.: PCT/ES2013/070248
§ 371 (c)(1),
(2) Date: Oct. 19, 2014

(87) PCT Pub. No.: WO2013/156655
PCT Pub. Date: Oct. 24, 2013

(65) Prior Publication Data
US 2015/0121402 A1 Apr. 30, 2015

(30) Foreign Application Priority Data
Apr. 19, 2012 (ES) .................................. 201230580

(51) Int. Cl.
*G06F 13/00* (2006.01)
*G06F 9/50* (2006.01)
(Continued)

(52) U.S. Cl.
CPC .............. *G06F 9/5011* (2013.01); *G06F 9/455* (2013.01); *G06F 9/50* (2013.01); *G06F 9/542* (2013.01)

(58) Field of Classification Search
CPC ....................................... G06F 9/541

USPC .......................................... 719/328
See application file for complete search history.

(56) References Cited

U.S. PATENT DOCUMENTS 5,537,548 A * 7/1996 Fin et al. ...................... 709/204
6,959,441 B2 * 10/2005 Moore .......................... 719/328
(Continued)

FOREIGN PATENT DOCUMENTS

WO WO2013156654 A1 4/2013
WO WO2013156655 A1 4/2013

OTHER PUBLICATIONS

Berdajs J et al., "Extending applications using an advanced approach to DLL injection and API hooking", Software Practice & Experience, Jun. 1, 2010 Wiley & Sons, Bognor Regis, GB Jan. 6, 2010 vol. 40 No. 7 pp. 567-584, ISSN 0038-0644 Doi: doi:10.1002/spe.973.
(Continued)

*Primary Examiner* — Andy Ho
(74) *Attorney, Agent, or Firm* — Hess Patent Law Firm LLC; Robert J. Hess (57) ABSTRACT

The invention relates to a method for controlling the use of hardware resources of a computer system by an application that is executed on an operating system comprising at least one application programming interface (API) that is executed on this computer system, using an executable piece of code adapted for being injected into a process belonging to the application. The method comprises: redirecting an API service to a corresponding service comprised in the piece of code; intercepting the call from the process to the API service; and acting on a software entity belonging to the process being executed on the basis of the interception of the call from the process to the API service.

16 Claims, 2 Drawing Sheets

(51) Int. Cl.
*G06F 9/455* (2006.01)
*G06F 9/54* (2006.01)

(56) References Cited

U.S. PATENT DOCUMENTS

| | | | |
|---|---|---|---|
| H2202 H | 4/2007 | Conover | |
| 8,255,931 B2 * | 8/2012 | Sandoval et al. | 719/328 |
| 8,683,576 B1 * | 3/2014 | Yun | 726/17 |
| 2007/0101435 A1 | 5/2007 | Konanka et al. | |
| 2009/0037585 A1 | 2/2009 | Miloushev et al. | |

OTHER PUBLICATIONS

Boyd T et al., "Injecting distributed capabilities into legacy applications through cloning and virtualization". Proceedings of the International Conference on Parallel and Distributed Processing Techniques and Applications. PDPTA'2000 2000 CSREA Press Athens, GA USA 00/00/2000 vol. 3 pp. 1431-1437 vol. 3 ISBN 1-892512-52-1 Arabnia H R. URL: http://citeseerx.ist.psu.edu/viewdoc/download?doi=10.1.1.25.9670&rep=rep1&type-pdf.

U.S. Appl. No. 14/395,479, Pajuelo Gonzalez, Alejandro et al.

* cited by examiner

METHOD, SYSTEM AND AN EXECUTABLE PIECE OF CODE FOR CONTROLLING THE USE OF HARDWARE RESOURCES OF A COMPUTER SYSTEM

The present invention relates to a method for controlling the use of hardware resources of a computer system by an application that is executed on an operating system comprising at least one application programming interface (API) that is executed on this computer system, using an executable piece of code adapted for being injected into a process belonging to the application.

The invention also relates to a system and to the executable piece of code suitable for carrying out this method.

BACKGROUND OF THE INVENTION

It has been known for some years now that computer evolution both at the software and hardware level is unstoppable.

At the hardware level, for example, processors are becoming increasingly faster and integrate new developments, whereas (volatile and non-volatile) memories are having more and more storage capacity.

Similarly, at the software level, applications (for example, operating systems, office or computer-assisted drawing applications, or games) are becoming increasingly powerful and implement greater functionalities, some of which were unthinkable a few years back.

The main drawback of this situation becomes apparent when balance is lost between the characteristics of the hardware resources of the user computer system and the hardware requirements of the software with which it works. To this day, it is not very clear if the software evolves with such great speed because programmers are aware that they have more and more hardware resources, or if the evolution of hardware is essential in order to be able to meet the increasing requirements of the different software implemented. If the software to be used has hardware requirements equal to or greater than the characteristics of the resources of the user computer system, the problems in the operation thereof is clear and obvious. Furthermore, it must be borne in mind that the hardware requirements of certain software are established taking into account that said software will be executed alone in the computer system, but the latter is a rather uncommon situation because, at least, it is entirely possible that there is software being executed in the background, which obviously will also be consuming hardware resources of the system (for example, an antivirus, a firewall, or backup software).

What seems clear is that software programmers are not used to taking into account that most user computer systems do not have state-of-the-art hardware resources and that with each new software or with each update of already existing software they are causing users to update these hardware resources and even to buy new computer systems so as to be able to at least execute that software and obtain a suitable software performance. All this ultimately leads to a high economical cost for the users, not only for acquiring the software but also for updating the hardware resources of their system.

These problems are also present in server-type (application server, data server, etc.) computer systems. An increase in hardware requirements by a server software (for example, after an update) can cause this server to not be able to provide service to all the users which it was managing up until that moment, if an update of its hardware resources has not been previously performed. Similarly, if the server is an application server, for example, the number of applications that it manages may have to be reduced in order to be able to provide service to the same number of users. It is important to point out that in the case of server-type systems the economical cost of this update of the hardware resources is even higher than the update that takes place in the situation described above, since the hardware resources for a server-type computer system have higher costs.

On the other hand, the situation may also arise in which, given a computer system with certain hardware resources, there is an intention to execute thereon a greater number of applications and/or of instances of one and the same application which it could theoretically execute. In this situation, the hardware resources are what they are and, therefore, it is necessary to act on the execution of the applications and/or of the different instances of one and the same application to reduce the consumption of the hardware resources that they use.

The operating system in any one of the situations described above is not capable of effectively controlling the use of hardware resources running the applications and/or the instances of one and the same application while it is being executed, so a tool is necessary for that purpose.

DESCRIPTION OF THE INVENTION

Therefore, an objective of the present invention is to provide a method for controlling the use of hardware resources by an application being executed, using an executable piece of code adapted for being injected into a process belonging to the application, which allows increasing the efficiency of the computer system on which the application is executed.

This objective is achieved by providing a method for controlling the use of hardware resources of a computer system by an application that is executed on an operating system comprising at least one application programming interface (API) that is executed on this computer system, using an executable piece of code adapted for being injected into a process belonging to the application, the method comprising:
  intercepting a call from the process belonging to the application to an application programming interface service;
  acting on a software entity belonging to the process being executed on the basis of the interception of the call from the process to the application programming interface service.

Therefore, using the executable piece of code which is injected into the process, the communications (both control signal and data communications) between the application being executed and the operating system are intercepted, such that the piece of code acts above the operating system and can manage or control software entities belonging to the process and reduce the use of hardware resources by same.

Basically, the executable piece of code which is injected into the process belonging to the application provides intelligence in terms of controlling the use of hardware resources of the computer system by an application that is executed thereon. Obviously, the control performed by the piece of code reduces the use of hardware resources, but always maintaining a minimal service quality.

As a result of the foregoing, this reduction in the use of hardware resources by an application can lead to these resources being used by other applications (or several instances of one and the same application) and therefore, to more applications being executed simultaneously by the computer system, increasing the efficiency thereof.

Similarly, this reduction in the use of hardware resources by an application can lead to it being also possible for an application with hardware requirements greater than those offered by a computer system, to be executed.

It is important to point out that the expressions "a service", "an application programming interface" or "software entity" relate to at least one service, at least one application programming interface, and/or at least one software resource, respectively. Thus, for example, it is possible to redirect two services of one and the same application programming interface to two services comprised in the piece of code, or redirect a service of a first application programming interface to a first service comprised in the piece of code and a service of a second application programming interface to a second service comprised in the piece of code. Likewise, depending on the redirected services, it is possible for the piece of code to act on one or more software entities, such as threads of execution, a memory or mutex locks.

One way to inject the executable piece of code into the process is described, for example, in ["*Windows NT System-Call Hooking*", Mark Russinovich and Bryce Cogswell, Dr. Dobb's Journal, January 1997].

It is important to point out that the piece of code can be injected into the process with the process initiated in the sleep state, which assures the correct operation of the piece of code. In this case, the method can comprise a step of resuming the execution of the process that is in the sleep state.

On the other hand, it is also important to point out that term "intercept" is interpreted to mean that the call from the process to the application programming interface service entails redirection to a service comprised in the piece of code, such that the piece of code itself is capable of controlling or acting on software entities belonging to the process and thus controlling the use of resources by the application.

Furthermore, the method can comprise redirecting an application programming interface service to a corresponding service comprised in the piece of code, such that the process calls, in a transparent manner, a corresponding service comprised in the piece of code, when it makes a call to an API service.

According to a preferred embodiment of the invention, the application programming interface service can be a function, and the step of redirecting an application programming interface service to a corresponding service comprised in the piece of code can comprise:
  loading in the memory the dynamic link library comprising the function of the application programming interface to be redirected;
  replacing, in the function pointer table for the application programming interface functions comprised in the loaded dynamic link library, the initial memory address in which the function of the application programming interface to be redirected is stored with the initial memory address in which the corresponding function comprised in the piece of code is stored.

One or more functions of each application programming interface are therefore redirected to functions comprised in the piece of code, such that the latter can intercept calls made to these functions by the process and thus control the use of hardware resources involving the execution thereof, by means of acting on software entities, such as the threads of execution, memory or mutex locks (also known as locks), among others.

The step of redirecting an application programming interface service to a corresponding service comprised in the piece of code can preferably comprise storing in a first variable the initial memory address in which the function of the application programming interface to be redirected is stored. Therefore, it is possible to make a call to the function of the application programming interface (i.e., to the original function) from the executable piece of code itself, if it is necessary at some point in time while the application is being executed.

According to another preferred embodiment of the invention, the application programming interface service can be an object method, and the step of redirecting an application programming interface service to a corresponding service comprised in the piece of code can comprise:
  loading in the memory the dynamic link library comprising the object method to be redirected;
  verifying if the object associated with the method to be redirected is created for the first time;
  in the event of a positive result in the verification,
    replacing, in the method pointer table for the object methods comprised in the loaded dynamic link library, the initial memory address in which the object method to be redirected is stored, with the initial memory address in which the corresponding method comprised in the piece of code is stored.

As in the case of functions, it is also possible to redirect one or more methods belonging to an object to one or more methods comprised in the piece of code, such that the latter can intercept calls made to these methods by the process and thus control the use of hardware resources involving the execution thereof.

Since, as discussed above, it is possible to redirect at least one service of at least one application programming interface, it is possible that one of the services is a function and another one of the services is a method, such that both embodiments described can become complementary for one and the same application being executed.

The step of redirecting an application programming interface service to a corresponding service comprised in the piece of code can also preferably comprise storing in a first variable the initial memory address in which the object method to be redirected is stored, such that, if required, this method (i.e., the original method) could be called from the piece of code itself.

According to one embodiment of the invention, the application programming interface service can be a service related with the software entity belonging to the process, this service being able to be intended for the creation of new threads of execution; the software entity can be a thread of execution; and the step of intercepting the call from the process to the application programming interface service can comprise:
  receiving a call from the process to the corresponding service comprised in the piece of code, for generating a new thread of execution;
  generating a new thread of execution on the basis of the corresponding service comprised in the piece of code;
  saving the identifier of the thread of execution generated in a second variable which maintains the register of the threads of execution created.

According to another embodiment of the invention, the application programming interface service can be a service related with the software entity belonging to the process, this service being intended for the creation of new threads of execution; the software entity can be a thread of execution; and the step of intercepting the call from the process to the application programming interface service can comprise:
  receiving a call from the process to the corresponding service comprised in the piece of code, for generating a new thread of execution;
  making a call to the application programming interface service on the basis of the initial memory address stored in the first variable;

receiving an identifier of the new thread of execution generated by the function of the application programming interface;

saving the identifier of the thread of execution generated in a second variable which maintains the register of the threads of execution created.

Given that it is possible to redirect more than one service related with a software entity of the thread-of-execution type, both described embodiments are not alternatives but rather can become complementary.

More specifically, in the first described embodiment, the service for generating a new thread of execution is comprised in the piece of code itself, whereas in the second embodiment, the service for generating a new thread of execution is not comprised in the piece of code and it is necessary to make a call to the original service of the application programming interface to successfully generate the thread of execution. To that end, it is necessary to have already stored in the first variable previously described the memory address in which the application programming interface service (i.e., the original service) is stored. Notwithstanding the foregoing, regardless of the implemented embodiment, the piece of code manages the identifier of the new thread of execution created, storing it in the variable which maintains the register of the threads of execution created.

If the software entity is a thread of execution, the step of acting on a software entity belonging to the process being executed on the basis of the interception of the call from the process to the application programming interface service can comprise:

determining a yield value of the application being executed;

verifying if this yield value of the application exceeds a threshold value;

in the event of a positive result, suspending the threads of execution for a predetermined time on the basis of the identifiers stored in the second variable which maintains the register of the threads of execution created.

Since the piece of code manages the identifiers of the threads of execution, if the piece of code (more specifically, an algorithm comprised in the piece of code) detects that the yield of the application is above a threshold value (i.e., in the event that the execution of the application is consuming to much resources or unnecessary resources), the piece of code can suspend the execution of the threads created up until that time on the basis of the identifiers thereof stored in the second variable, which means that the piece of code can be capable of controlling the use of hardware resources consumed by the application.

The step of determining a yield value of the application being executed on the basis of the use made of hardware resources can comprise:

establishing as a control point an application programming interface service which the process will iteratively call while it is being executed;

determining the time lapsed between a first call and a second call to this service by the process;

obtaining a yield value of the application being executed on the basis of the time that is determined.

The time lapsed between the first call and the second call to the service which is used as a control point can be measured according to the FPS (Frames per Second) metrics.

On the other hand, any algorithm measuring the difference in the execution time necessary for maintaining the yield obtained with respect to the time required for maintaining the desired yield can be used to determine the time in which the threads of execution must be suspended. This algorithm can be comprised in the piece of code, although a call can also be made to an external algorithm from the piece of code.

If the software entity is related with the memory and the application programming interface service is a service intended for reserving memory areas, the step of intercepting the call from the process to the application programming interface service can comprise:

receiving a call from the process to the corresponding service comprised in the piece of code for reserving a memory area.

Furthermore, in this case, the step of acting on a software entity belonging to the process being executed on the basis of the interception of the call from the process to the application programming interface service can comprise:

reserving a shared memory area.

Therefore, when the process calls the application programming interface service for reserving a memory area, this call is intercepted (i.e., the call is redirected to a corresponding service comprised in the piece of code) and a memory area intended for being shared by different instances of one and the same application is assigned.

An example is described below to clearly show how the piece of code controls the use of hardware resources while an application is being executed, when the software entity is the memory.

If based on an application that requires, for example, 1 gigabyte of memory for execution, the execution of a second instance of this application would entail one additional gigabyte, i.e., the execution of the two instances would entail a total of 2 gigabytes of memory consumed. In the case of injecting the executable piece of code object of the invention into both instances of the application, the memory consumption may be less than 2 gigabytes, since memory areas shared by different instances being executed could be assigned. At this point, it is necessary to clarify that in most cases it may be impossible to share the entire memory (1 gigabyte in the present example) required by each instance of the application, since information can exist in certain memory areas that must not be modified by other instances of the application. Therefore, before assigning the memory areas, the memory areas that must not be modified as they contain information characteristic of each instance must be identified.

On the other hand, it is also possible that the call from the process to the corresponding service comprised in the piece of code involves a call from this piece of code to the function of the original application programming interface intended for reserving a memory area, this call being made on the basis of the memory address stored in the first variable mentioned above.

On the other hand, if the software entity is a lock or mutex lock and if the application programming interface service is a service intended for intervening on a mutex lock, the step of intercepting the call from the process to the application programming interface service can comprise:

receiving a call from the process to the corresponding service comprised in the piece of code for intervening on a mutex lock;

In this case, the step of acting on a software entity belonging to the process being executed on the basis of the interception of the call from the process to the application programming interface service can comprise:

modifying the name assigned to the mutex lock.

There are some applications (for example, some games) that do not allow executing more than one instance of the application on one and the same computer system. To that end, they use locks or mutex locks which assign an identifier to the instance of the application being executed and, given that all new instances to be generated will receive the same identifier, it makes executing more than one instance unfeasible.

In view of this situation, and as described above, when the process tries to create the mutex lock associated with the application and calls the corresponding service comprised in the piece of code (the pointer of the original application programming interface service intended for this action will have to be previously redirected to the service comprised in the piece of code), the piece of code causes a modification of the identifier assigned to the mutex lock, such that when a second instance of the application is generated, the identifiers do not coincide with one another and the simultaneous execution thereof is allowed.

According to another aspect of the invention, an executable piece of code comprising instructions for executing a method for controlling the use of hardware resources of a computer system previously described is provided, this executable piece of code being adapted for being injected into a process belonging to an application when this application is executed on an operating system comprising at least one application programming interface (API) that is executed on this computer system.

This executable piece of code can be stored in physical storage media, such as recordable media, a computer memory, or a read-only memory, or can be carried by a carrier wave, such as an electrical or optical carrier wave.

Furthermore, the invention provides a method for executing an application on a computer system, which can comprise:

initiating the execution of a process associated with the application, in the sleep state;
injecting the executable piece of code previously described into the process in the sleep state;
executing the method previously described for controlling the use of hardware resources of a computer system by the application that is executed on an operating system comprising at least one application programming interface (API) that is executed on this computer system, using the executable piece of code injected into the process.

Therefore, when a user requests for the execution of an application on a computer system, it can be executed according to the described method, with the intention that the piece of code controls the use of hardware resources.

According to another aspect of the invention, a system for controlling the use of hardware resources of a computer system by an application that is executed on an operating system comprising at least one application programming interface (API) that is executed on this computer system is provided, the system being adapted for being injected into a process belonging to the application, the system comprising:

computer means for intercepting the call from the process to the application programming interface service;
computer means for acting on a software entity belonging to the process being executed on the basis of the interception of the call from the process to the application programming interface service.

According to yet another aspect, the invention provides a computer system on which an application can be executed, which system can comprise a memory and a processor, can incorporate processor-executable instructions stored in the memory, the instructions being able to comprise functionalities for:

initiating the execution of a process associated with the application, in the sleep state;
injecting the executable piece of code described previously, in the process in the sleep state;
executing the method described previously for controlling the use of hardware resources of a computer system by the application that is executed on an operating system comprising at least one application programming interface (API) that is executed on this computer system, using the executable piece of code injected into the process.

Throughout the description and the claims, the word "comprises" and variants thereof do not intend to exclude other technical features, supplements, items or steps. For those skilled in the art, further objects, advantages and features of the invention will be derived in part from the description and in part from the practice of the invention. The examples and drawings are provided by way of illustration, and they are not meant to limit the present invention. The reference numbers relating to the drawings and placed between parentheses in a claim are intended only to try to improve understanding of the claim and must not be interpreted as limiting the scope of protection of the claim. Furthermore, the present invention covers all the possible combinations of particular and preferred embodiments herein indicated.

BRIEF DESCRIPTION OF THE DRAWINGS

To better understand what has been described above, drawings schematically depicting practical embodiments by way of non-limiting example are attached.

In the drawings.

DESCRIPTION OF A PREFERRED EMBODIMENT OF THE INVENTION

The description of a method and an executable piece of code according to the invention for controlling the use of hardware resources of a computer system by an application that is executed on an operating system comprising at least one application programming interface (API) that is executed on this computer system will be provided below, this piece of code being adapted for being injected into a process associated with the application, the process of which has been initiated in the sleep state.

Figure 1:
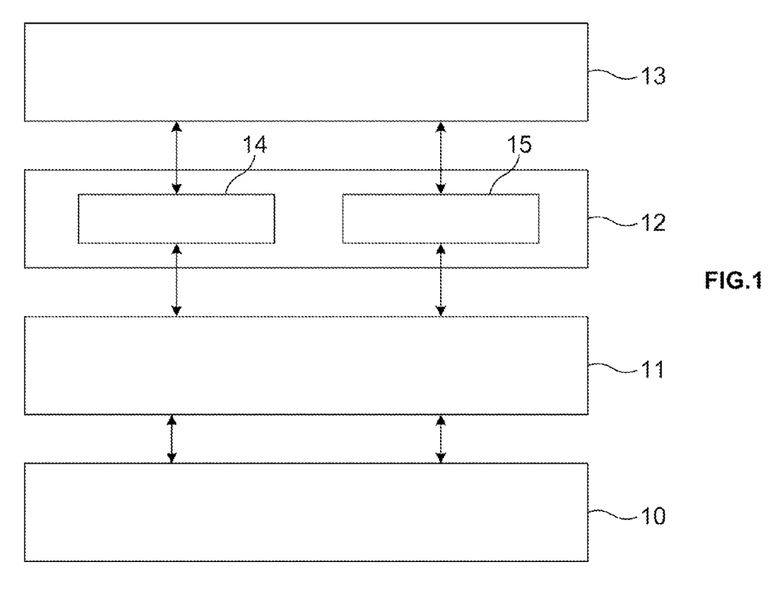
FIG. 1 is a block diagram depicting the layers of execution of an application on a computer system, according to the state of the art.

FIG. 1 shows a diagram depicting the layers of execution of an application (for example, a game) on a computer system (for example, a personal computer, a server, etc.), according to the state of the art.

In this diagram, the lowest level layer 10 represents the hardware resources of the computer system, such as the microprocessor (CPU), the memory, the graphic processing unit (GPU), the keyboard or the mouse, among others.

In a second layer 11 arranged in an upper level, there is located the operating system, having the drivers necessary for two-way communication and interaction (being able to send and/or receive information about these resources, such as control signals 14 or data 15) with the resources of the lower layer 10.

In a third layer 12 arranged above the layer 11 representing the operating system, there are located application programming interfaces (better known as API), both those that are comprised in the operating system and those resulting from the installation of the drivers of a resource of the lower layer 10. These API are usually implemented in dynamic link libraries, regardless of the operating system used. Communication between the layer 12 comprising the API and the layer 11 representing the operating system is also a two-way communication, being able to exchange both control signals 14 and data 15.

Finally, FIG. 1 also shows a fourth layer or highest level layer 13 depicting the application being executed. While it is being executed, this application accesses the layer 12 representing the API, exchanging both control signals and data.

Therefore, according to this configuration, if, for example, the application being executed 13 requires the generation of a window on the display screen of the computer system on which it is being executed, the application must access certain API 12 services (either functions or methods) intended for generating windows. To be able to generate the window on the screen, these services need to exchange information (control signals and data) with the operating system 11, which has the necessary tools (i.e., drivers) for communicating with the screen 10 and thus causing the generation of the desired window.

The main drawback of this configuration is that there is no element or tool whatsoever that is capable of efficiently or effectively managing the use of hardware resources of the computer system by the application being executed. In the case that has been described, the application uses the resources that it requires for the execution thereof.

For this reason, the invention implements an executable piece of code which is injected into the process associated with the application, this process having been initiated in the sleep state, for example, so that it can control the hardware resources used by the application while it is being executed.

Figure 2:
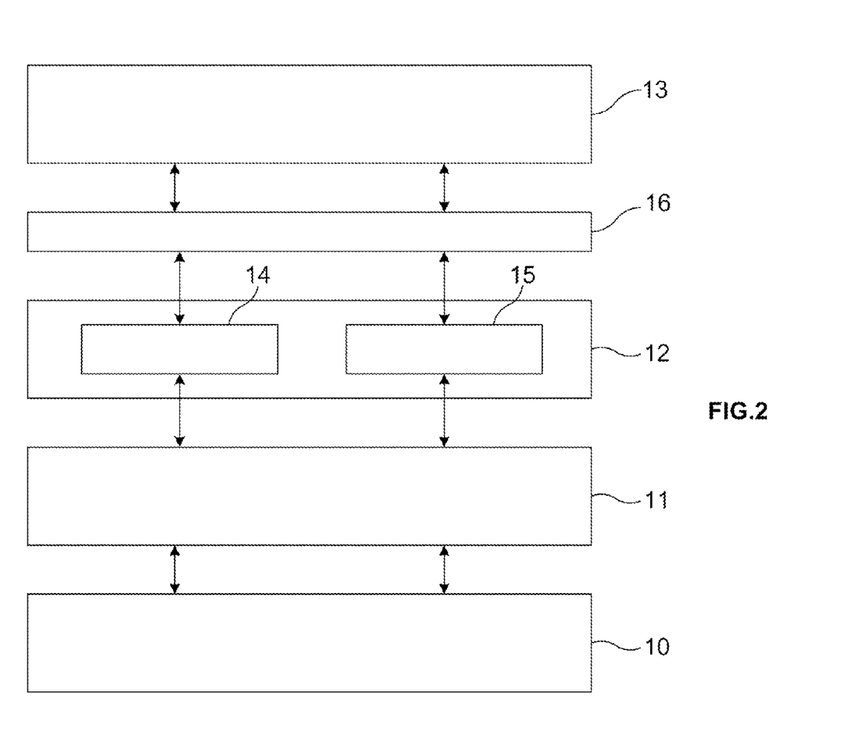
FIG. 2 is a block diagram depicting the layers of execution of an application on a computer system and furthermore incorporating a layer representing an executable piece of code injected into a process belonging to the application, this piece of code being intended for controlling the use of hardware resources of a computer system by the application, according to the invention.

FIG. 2 shows a diagram based on the one of FIG. 1, but it further comprises a layer 16 representing the executable piece of code which, after being injected into the process associated with the application, is arranged at logic level between layer 13 of the application and layer 12 representing the APIs, such that the piece of code can intercept calls from the application to certain API services (for example, functions or methods) and thus control the use of hardware resources by the application, acting on one or more software entities belonging to the process.

More specifically, the method executed by the piece of code is as follows. It is described based on an initial situation in which, when a user executes an application, the process belonging to the application is initiated in the sleep state. During this sleep state, the executable piece of code is injected into the process.

Once the piece of code is injected into the process, this piece of code loads in the memory all those dynamic link libraries containing the application programming interfaces (API) containing those services (either functions or methods) which are going to be required by the application while it is being executed. Then, after the operating system has filled the service pointer table for the services of the different APIs loaded in the memory according to the initial memory addresses in which these services have been stored, it replaces in this pointer table the initial memory address of each of the services which may or will be required by the application while it is being executed, with the initial memory address in which each of the corresponding services comprised in the piece of code is located. Therefore, on the basis of this redirection performed, the piece of code is capable of intercepting calls that the process makes to these relevant services for execution thereof, i.e., the calls the process makes to the different relevant services of the different APIs are received by the piece of code, since the pointers do not point to the API services but to the corresponding services comprised in the piece of code.

On the basis of the mentioned interception, the piece of code acquires the capacity to control the use of hardware resources of the computer system by the application, i.e., the piece of code takes control, in a manner that is transparent for the process, of the use of hardware resources of the system by the application.

More specifically, when the process tries to access a hardware resource of the computer system by means of calls to certain API services, the piece of code executes its own services (i.e., performs an interception of these calls). On the basis of this interception, the piece of code acts on a certain software entity, depending on the type of service to which the process makes the call.

Therefore, if the API service which is intercepted is a service intended for the creation of new threads of execution (i.e., the software entity on which the piece must act will be a thread of execution), the step of interception can comprise:
    receiving a call from the process to the corresponding service comprised in the piece of code, for generating a new thread of execution;
    generating a new thread of execution on the basis of the corresponding service comprised in the piece of code;
    saving the identifier of the thread of execution generated in a certain variable which maintains the register of the threads of execution created.

For the case that has been described (i.e., if the API service which is intercepted is a service intended for the creation of new threads of execution) it is also possible that intercepting the call from the process to the application programming interface service can alternatively comprise:
    receiving a call from the process to the corresponding service comprised in the piece of code, for generating a new thread of execution;
    making a call to the function of the application programming interface on the basis of the initial memory address stored in the variable intended for storing such information;
    receiving an identifier of the new thread of execution generated by the application programming interface service;
    saving the identifier of the thread of execution generated in a variable intended for maintaining the register of the threads of execution created.

In any case, if the API service which is intercepted is a service intended for the creation of new threads of execution, the step of acting on a software entity can comprise:
    determining a yield value of the application being executed;
    verifying if this yield value of the application exceeds a threshold value;
    in the event of a positive result, suspending the threads of execution previously created for a predetermined time on the basis of the identifiers stored in the variable intended for maintaining the register of the threads of execution created.

Therefore, since the identifiers of the threads of execution are managed by the piece of code (said piece of code stores the identifiers in a variable that it manages), in the event that the piece of code detects that the yield of the application is above a threshold value (i.e., if the execution of the application is consuming too much resources or unnecessary resources), the piece of code can suspend the execution of the threads created up until that time on the basis of the identifiers thereof stored in the corresponding variable, which means that the piece of code can be capable of controlling the use of hardware resources consumed by the application.

The step of determining a yield value of the application being executed which has been described can comprise:
- establishing as a control point an application programming interface service which the process will iteratively call while it is being executed;
- determining the time lapsed between a first call and a second call to this service by the process;
- obtaining a yield value of the application being executed on the basis of the time that is determined.

If the intercepted API service is a service intended for reserving memory areas, the step of intercepting the call from the process to the application programming interface service can comprise:
- receiving a call from the process to the corresponding service comprised in the piece of code for reserving a memory area.

In this case (i.e., the intercepted call is a call to a service intended for reserving memory areas), the step of acting on a software entity belonging to the process being executed can comprise:
- reserving a shared memory area.

Therefore, when the process calls the application programming interface service for reserving a memory area, this call is intercepted (i.e., the call is redirected to a corresponding service comprised in the piece of code) and a memory area intended for being shared by different instances of one and the same application is assigned, i.e., the corresponding service comprised in the piece of code assigns a memory area intended for being shared by different instances of one and the same application to the process.

Finally, if the intercepted call corresponds to an API service intended for intervening on a mutex lock, the step of intercepting the call from the process to the application programming interface service can comprise:
- receiving a call from the process to the corresponding service comprised in the piece of code for intervening on a mutex lock;
- modifying the name assigning to the mutex lock;

whereas the step of acting on a software entity belonging to the process being executed on the basis of the interception of the call from the process to the application programming interface service can comprise:
- modifying the name assigned to the mutex lock.

There are some applications (for example, some games) that do not allow executing more than one instance of the application on one and the same computer system. To that end, they use locks or mutex locks which assign an identifier to the instance of the application being executed and, given that all new instances to be generated will receive the same identifier, it makes executing more than one instance unfeasible.

In view of this situation, and as described above, when the process tries to create the mutex lock associated with the application and calls the corresponding service comprised in the piece of code (the pointer of the original application programming interface service intended for this action will have to be previously redirected to the service comprised in the piece of code), the piece of code causes a modification of the identifier assigned to the mutex lock, such that when a second instance of the application is generated, the identifiers do not coincide with one another and the simultaneous execution thereof is allowed.

Accordingly, what has been described up until now clearly shows that the piece of code is capable of controlling the use of hardware resources of the computer system by the application on the basis of the calls to different types of API service that it intercepts, acting on the software entities corresponding with these types of service.

A preferred embodiment of the invention will be described below, in which the operating system is any one from the Windows family, for example, Windows 7; the computer system is an application server, more specifically a game server; and the applications to be executed are games and/or different instances of one and the same game. Furthermore, the software entity on which the piece of code intervenes for controlling the use of hardware resources by the application corresponds to the different threads of execution which have been created up until that time, while the process is being executed.

More specifically, the present preferred embodiment has the following operation. The objective of the game server is to allow the users of the service to play different games or even the same computer game from their mobile terminals, such as smartphones or tablets. The execution of each game or of each instance of the same game can be sent by means of streaming techniques from the game server to the mobile devices of the users. Therefore, from a mobile device belonging to the user, said user can select the game to be played, requesting execution thereof by means of actuating on a control element (for example, an icon representative of the game) of a graphic user interface shown on the screen of the user's mobile terminal. This actuation by the user on the control element generates a control signal to the game server causing the execution of the selected game on the server.

Given that there may be a large number of users requesting the execution of a game (i.e., there may be a large number of games being executed), the present invention seeks to control the execution of each game so that the hardware resources used are the least possible, such that the maximum number of games can be executed simultaneously and it can therefore provide service to the maximum number of users.

Therefore, when a user requests the execution of a game from his/her mobile terminal, the main process of the application being executed (i.e., the game) is created in the game server, in the sleep state. To that end, the function CreateProcess is used, assigning the CREATE_SUSPENDED value to the creation mode parameter (CreateFlags). Once the process has been initiated in the sleep state, the executable piece of code according to the invention is injected into the process, the objective of which is to optimize the software entities belonging to the process.

Before resuming the execution of the process (it must be borne in mind that the process is initiated in the sleep state), the injected piece of code redirects the API functions to be intercepted. According to the present preferred embodiment, two categories of functions are to be intercepted:
- for registering the creation of threads of execution, by means of the function CreateThread;
- for establishing control points while the process is being executed. Therefore, by using these control points, the yield of the application can be measured in a manner transparent to the process by means of functions in relation to which, a priori, it is known that they will be iteratively called throughout the execution of the entire process. Therefore, for example, in graphics applications, the function of each frame per screen can be established as a control point, by means of the method Present1 of the API IDXGISwapChain1, such that the yield of the application is obtained by measuring the number of frames shown per second (FPS). The objective is for the injected piece of code to identify when the application has exceeded a predetermined yield threshold, to prevent the excessive use of hardware resources of the computer system (i.e., the game server) and, therefore, to balance the yield along with that of other applications (i.e., games or instances of the same game) being executed. When the yield of the application exceeds the predetermined threshold, the threads of execution associated with the process can be suspended for the time period necessary so that the yield does not exceed this threshold.

In a Windows operating system, these described APIs are usually implemented in dynamic link libraries (DLLs). For this reason, the piece of code loads, by means of the function LoadLibrary, the library containing the function to be redirected, for example, CreateThread of the library kernel32.dll and Present1 of the API IDXGISwapChain1, through the library dxgi.dll. Basically, LoadLibrary loads the library in the memory and fills the Index Address Table (IAT), which is a pointer table for the API functions, with the initial addresses in the memory of the API functions. The necessary pointers are modified by means of the function RedirectIAT making them correspond to the functions belonging to the piece of code injected into the process. At the same time, the original content of the table (i.e., the pointer for the initial memory position in which the function is stored) is saved in a variable in case there is a need to call the original function at some point in time.

On the other hand, since the API IDXGISwapChain1 is a COM-type interface, it is necessary to modify the pointer table of the interface for replacing the methods to be intercepted, such as Present1, for example. The method pointer table of a COM-type interface is modified with a specific code. For example, Present1 corresponds to position 4 of the method table of the IDXGISwapChain1 interface and it has to be modified so that it points to the function comprised in the injected piece of code. At the same time, the original content of this position is saved in a variable in case there is a need to call the original method. The modification of the pointer table of a COM-type interface only has to be performed the first time an object of that type is created. At the moment when the redirection of the services ends, i.e., all the functions or methods of all the necessary APIs have been redirected, the execution of the process of the application resumes.

When the process tries to create a new thread of execution, the function CreateThread is executed for storing information of the new thread that is going to be created. To that end, the piece of code makes a call to the original function CreateThread for the execution thereof, and the piece of code itself saves the identifier of the new thread of execution in a variable which maintains the register of all the threads of execution created up until that time. In the present preferred embodiment, the original function CreateThread is used, i.e., a call is made from the piece of code to this original API function on the basis of the memory address stored in the corresponding variable (the variable storing the pointers at initial memory position in which each redirected function is stored), but the situation may also arise in which the piece of code comprises the function to create threads of execution and it is not necessary to make a call to an external function. In any of the cases, the piece of code manages the identifiers of the threads of execution created.

On the other hand, and as previously described, it is also possible to measure the yield of the application being executed every time the process associated with the application makes a call to a function used as a control point, for example, in the present preferred embodiment, to the function Present1. To that end, the time lapsed since the last call to this function is measured by means of a specific algorithm to calculate the yield, for example, with the FPS (Frames per Second) metrics. If the algorithm for measuring the yield comprised in the injected piece of code identifies that a predetermined threshold value has been exceeded, the necessary time that the threads of execution must be suspended is calculated. This time can be calculated by means of an algorithm measuring the difference in the execution time necessary for maintaining the actual yield with respect to the time required for maintaining the desired yield. Next, the piece of code causes all the threads of execution (i.e., the piece of code acts on a software entity such as the threads of execution) created by the process up until that time (the identifiers of which have been saved in the corresponding variable previously described) to be suspended for as much time as has been calculated, by means of the functions SuspendThread and Sleep of the library kernel32.dll, for example. Once the calculated time period has elapsed, the threads of execution are again activated by means of the function ResumeThread of the library kernel32.dll, for example. After that instant, the normal execution of the process continues until the next time the process calls the control function again (in the present preferred embodiment, the function Present1).

Therefore, when the piece of code acts on the software entity referring to the threads of execution, the piece of code controls the use of the hardware resources available in the game server by the application (more specifically, the game) while it is being executed.

According to another preferred embodiment of the invention, the piece of code can also act on another software entity such as the memory. In this case, the piece of code must redirect all those API services (for example, functions and/or methods) intended for managing the reservation of memory areas to services comprised in the piece of code itself, such that these services comprised in the piece of code are capable of assigning memory areas to be shared by the different instances of one and the same game. Therefore, the instances being executed can share certain memory areas, such that the use of memory by these instances would be reduced considerably. It must be taken into account that, in certain cases, there will be exclusive memory areas for each instance being executed that cannot be shared (being able to contain, for example, data relating to the user who has requested the execution of the instance). Therefore, before reserving memory areas, the piece of code must determine which memory areas can be shared and which cannot be shared.

As in the case of a thread-of-execution type software entity, the memory area required by the application can also be assigned by means of a call to the original API function from the piece of code, this piece of code controlling the memory area that must be assigned at all times.

On the other hand, the piece of code is also capable of managing another type of software entity such as the locks or mutex locks so that it is possible to execute more than one instance of one and the same game on the same game server. Programmers often include mutex locks in the world computer gaming to prevent a user from being able to execute more than one instance of the game on the same computer system. To that end, when a first instance of the game is created, the mutex lock generates a predetermined label associated with the game (the label is unique for each game), such that when the user tries to execute a second instance of a game which is being executed, the mutex lock determines the existence of an instance being executed (through the existence of the label) and does not allow the execution of this second instance of the game.

To overcome this drawback, the piece of code which is injected into the process belonging to the game redirects the API services intended for managing the mutex locks to corresponding services comprised in the piece of code itself. Therefore, the piece of code can intercept these services and modify the predetermined label assigned thereto by the mutex lock, such that when the user tries to execute a second instance of the game, the service does not detect any instance with the predetermined label and allows this execution. Since the piece of code has been injected into the process corresponding to each instance being executed, the label assigned thereto is different for each instance.

Although a specific embodiment of the present invention has been described and depicted, it is obvious that the person skilled in the art may introduce variants and modifications or replace the details with other technically equivalent details without departing from the scope of protection defined by the attached claims.

Although the embodiments of the invention described with reference to the drawings comprise computer systems and processes carried out in computer systems, the invention also covers computer programs or executable pieces of code, more particularly computer programs in or on carrier media, suitable for putting the invention into practice. The computer program can be in the form of a source code, an object code or of an intermediate code between a source code and an object code, such as in a partially compiled form, or in any other form suitable for use in the implementation of the processes according to the invention. The carrier medium can be any entity or device capable of carrying the program.

For example, the carrier medium can comprise a storage media, such as a ROM, for example a CD ROM or a semiconductor ROM, or a magnetic recordable medium, for example a floppy disc or a hard disc. Furthermore, the carrier medium can be a transmissible carrier medium such as an electrical or optical signal that can be transmitted through an electrical or optical cable or by means of radio or other means.

When the computer program is contained in a signal that can be directly transmitted by means of a cable or another device or means, the carrier medium can be formed by said cable or another device or means.

Alternatively, the carrier medium can be an integrated circuit in which the computer program is embedded, said integrated circuit being suitable for carrying out, or for being used in carrying out the relevant processes.

The invention claimed is:

1. A method for controlling the use of hardware resources of a computer system by an application that is executed on an operating system comprising at least one application programming interface that is executed on the computer system, using an executable piece of code adapted for being injected into a process belonging to the application, the method comprising:

intercepting a call from the process belonging to the application to an application programming interface service, wherein the intercepting at least comprises redirecting the application programming interface service to a corresponding service comprised in the piece of code; and     acting on a software entity belonging to the process being executed on the basis of the interception of the call from the process to the application programming interface service, wherein the application programming interface service is a service related with the software entity belonging to the process, this service being intended for the creation of new threads of execution, wherein the software entity is a thread of execution, and wherein the call from the process to the application programming interface service is intercepted, and wherein acting on a software entity belonging to the process being executed on the basis of the interception of the call from the process to the application programming interface service comprises:

determining a yield value of the application being executed;

verifying if this yield value of the application exceeds a threshold value; and     in the event of a positive result, suspending the threads of execution for a predetermined time on the basis of identifiers stored in a second variable which maintains a register of the threads of execution created.

2. The method according to claim 1, wherein the application programming interface service is a function, and wherein redirecting the application programming interface service to a corresponding service comprised in the piece of code comprises:

loading in memory a dynamic link library comprising the function of the application programming interface to be redirected; and     replacing, in a function pointer table for the application programming interface functions comprised in the loaded dynamic link library, an initial memory address in which the function of the application programming interface to be redirected is stored with the initial memory address in which a corresponding function comprised in the piece of code is stored.

3. The method according to claim 2, wherein redirecting the application programming interface service to a corresponding service comprised in the piece of code comprises:

storing in a first variable the initial memory address in which the function of the application programming interface to be redirected is stored.

4. The method according to claim 1, wherein the application programming interface service is an object method, and wherein redirecting the application programming interface service to a corresponding service comprised in the piece of code comprises:

loading in memory a dynamic link library comprising the object method to be redirected;

verifying if an object associated with the object method to be redirected is created for the first time; and     in the event of a positive result in the verification,         replacing, in a method pointer table for the object method methods comprised in the loaded dynamic link library, an initial memory address in which the object method to be redirected is stored, with the initial memory address in which a corresponding method comprised in the piece of code is stored.

5. The method according to claim 4, wherein redirecting the application programming interface service to a corresponding service comprised in the piece of code comprises:

storing in a first variable the initial memory address in which the object method to be redirected is stored.

6. The method according to claim 1, wherein intercepting the call from the process to the application programming interface service comprises:

receiving the call from the process to the corresponding service comprised in the piece of code, for generating a new thread of execution;

generating the new thread of execution on the basis of the corresponding service comprised in the piece of code; and saving an identifier of the thread of execution generated in the second variable which maintains the register of the threads of execution created.

7. The method according to claim 5, wherein intercepting the call from the process to the application programming interface service comprises:

receiving the call from the process to the corresponding service comprised in the piece of code, for generating a new thread of execution;

making the call to the function of the application programming interface on the basis of the initial memory address stored in the first variable;

receiving an identifier of the new thread of execution generated by the application programming interface service; and saving the identifier of the thread of execution generated in the second variable which maintains the register of the threads of execution created.

8. The method according to claim 1, wherein determining the yield value of the application being executed ,on the basis of the use made of hardware resources, comprises:

establishing as a control point the application programming interface service which the process will iteratively call while it is being executed;

determining a time elapsed between a first call and a second call to this service by the process; and obtaining the yield value of the application being executed on the basis of the time that is determined.

9. The method according to claim 1, wherein the application programming interface service is a service related with the software entity corresponding to the process, this service being intended for reserving memory areas; wherein the software entity is a memory; and wherein intercepting the call from the process to the application programming interface service comprises:

receiving the call from the process to the corresponding service comprised in the piece of code for reserving a memory area.

10. The method according to claim 9, wherein acting on a software entity belonging to the process being executed on the basis of the interception of the call from the process to the application programming interface service comprises:

reserving a shared memory area.

11. The method according to claim 1, wherein the application programming interface service is a service related with the software entity corresponding to the process, this service being intended for intervening on a mutex lock; wherein the software entity is a mutex lock; and wherein intercepting the call from the process to the application programming interface service comprises:

receiving the call from the process to the corresponding service comprised in the piece of code for intervening on a mutex lock.

12. The method according to claim 11, wherein acting on a software entity belonging to the process being executed on the basis of the interception of the call from the process to the application programming interface service comprises:

modifying a name assigned to the mutex lock.

13. The method according to claim 1, wherein the process belonging to the application was initiated in a sleep state, the method comprising:

resuming the execution of the process that is in the sleep state.

14. A method for executing an application on an operating system of a computer system, comprising:

initiating execution of a process associated with the application, in a sleep state;

injecting an executable piece of code comprising instructions for executing a method for controlling the use of hardware resources of a computer system into the process in the sleep state; and executing the method for controlling the use of hardware resources of the computer system by the application that is executed on the operating system comprising at least one application programming interface that is executed on the computer system using the executable piece of code injected into the process, the method comprising:

intercepting a call from the process belonging to the application to an application programming interface service, wherein the intercepting at least comprises redirecting the an application programming interface service to a corresponding service comprised in the piece of code; and acting on a software entity belonging to the process being executed on the basis of the interception of the call from the process to the application programming interface service, wherein the application programming interface service is a service related with the software entity belonging to the process, this service being intended for the creation of new threads of execution, wherein the software entity is a thread of execution, and wherein the call from the process to the application programming interface service is intercepted, and wherein acting on a software entity belonging to the process being executed on the basis of the interception of the call from the process to the application programming interface service comprises:

determining a yield value of the application being executed;

verifying if this yield value of the application exceeds a threshold value; and in the event of a positive result, suspending the threads of execution for a predetermined time on the basis of identifiers stored in a second variable which maintains a register of the threads of execution created.

15. A system for controlling the use of hardware resources of a computer system by an application that is executed on an operating system comprising at least one application programming interface that is executed on the computer system, the system being adapted for being injected into a process belonging to the application, the system comprising:

computer means for intercepting a call from the process to an application programming interface service, wherein the intercepting at least comprises redirecting the application programming interface service to a corresponding service comprised in a piece of code; and computer means for acting on a software entity belonging to the process being executed on the basis of the interception of the call from the process to the application programming interface service, wherein the application programming interface service is a service related with the software entity belonging to the process, this service being intended for the creation of new threads of execution, wherein the software entity is a thread of execution, and wherein the call from the process to the application programming interface service is intercepted, and wherein acting on a software entity belonging to the process being executed on the basis of the interception of the call from the process to the application programming interface service comprises:

determining a yield value of the application being executed;

verifying if this yield value of the application exceeds a threshold value; and in the event of a positive result, suspending the threads of execution for a predetermined time on the basis of identifiers stored in a second variable which maintains a register of the threads of execution created.

16. A computer system on which an application is executed, comprising a memory and a processor, incorporating processor(currently amended):executable instructions stored in the memory, the instructions comprising functionalities for:

initiating the execution of a process associated with the application, in a sleep state;

injecting an executable piece of code comprising instructions for executing a method for controlling the use of hardware resources of a computer system into the process in the sleep state; and     executing the method for controlling the use of hardware resources of the a computer system by the application that is executed on an operating system comprising at least one application programming interface that is executed on the computer system, using the executable piece of code injected into the process, the method comprising:

intercepting a call from the process belonging to the application to an application programming interface service, wherein the intercepting at least comprises redirecting the application programming interface service to a corresponding service comprised in the piece of code; and         acting on a software entity belonging to the process being executed on the basis of the interception of the call from the process to the application programming interface service, wherein the application programming interface service is a service related with the software entity belonging to the process, this service being intended for the creation of new threads of execution, wherein the software entity is a thread of execution, and wherein the call from the process to the application programming interface service is intercepted, and wherein acting on a software entity belonging to the process being executed on the basis of the interception of the call from the process to the application programming interface service comprises:

determining a yield value of the application being executed;

verifying if this yield value of the application exceeds a threshold value; and     in the event of a positive result, suspending the threads of execution for a predetermined time on the basis of identifiers stored in a second variable which maintains a register of the threads of execution created.

* * * * *